United States Patent [19]

Marinkovich

[11] Patent Number: 5,216,976
[45] Date of Patent: Jun. 8, 1993

[54] METHOD AND APPARATUS FOR HIGH-INTENSITY CONTROLLED ENVIRONMENT AQUACULTURE

[76] Inventor: Vincent S. Marinkovich, 939 S. Cabrillo Ave. #4, San Pedro, Calif. 90731

[21] Appl. No.: 111,875

[22] Filed: Oct. 23, 1987

[51] Int. Cl.$^5$ ............... A01K 61/00; A01K 63/06
[52] U.S. Cl. ............................................ 119/3
[58] Field of Search ........................ 119/3; 55/95

[56] References Cited

U.S. PATENT DOCUMENTS

| | | |
|---|---|---|
| 3,884,651 | 5/1975 | Velegol ................... 55/95 X |
| 3,957,017 | 5/1976 | Carmignani et al. ............. 119/3 |
| 4,144,840 | 3/1979 | Bubien ..................... 119/3 |
| 4,169,050 | 9/1979 | Serfling et al. ............... 119/3 |
| 4,394,846 | 7/1983 | Roels ..................... 119/3 X |
| 4,697,291 | 10/1987 | Shepherd et al. .............. 55/95 X |

FOREIGN PATENT DOCUMENTS 54542  4/1982  Japan ..................... 119/3

*Primary Examiner*—Robert P. Swiatek
*Attorney, Agent, or Firm*—Fulwider Patton Lee & Utecht

[57] ABSTRACT

Post-larval organisms are introduced and held for growth to marketable size in a controlled environmental unit which has a dome over a body of water. The configuration of the unit and the techniques of establishing a self-sustaining eco-system within the unit and heating the body of water by bubbling heated air therethrough allows for maintaining the living conditions of the organism in a location geographically remote from its natural habitat.

13 Claims, 2 Drawing Sheets

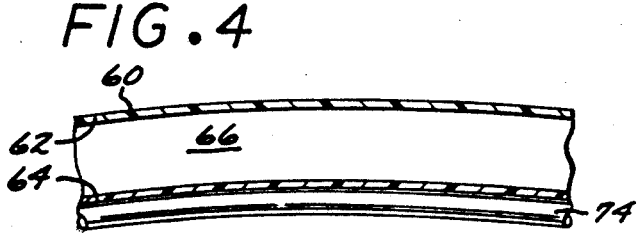
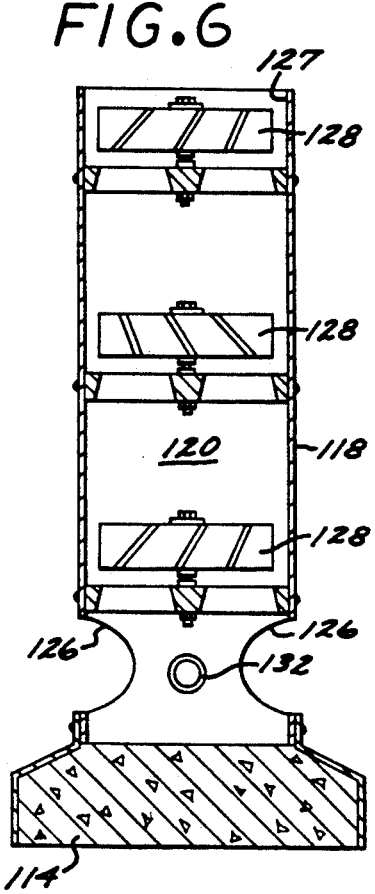
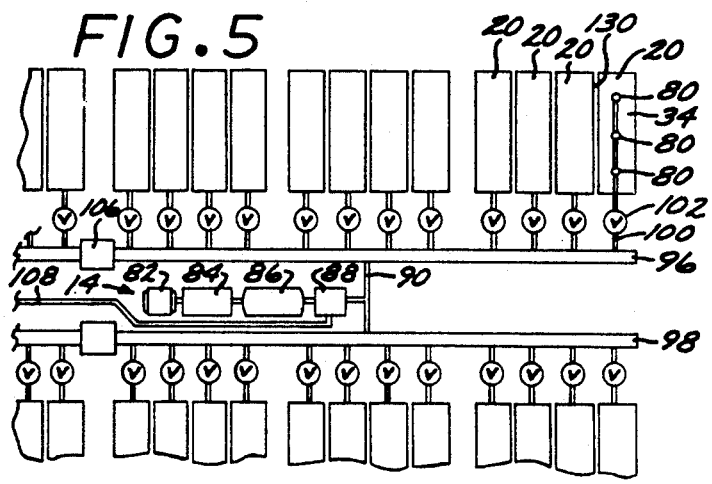
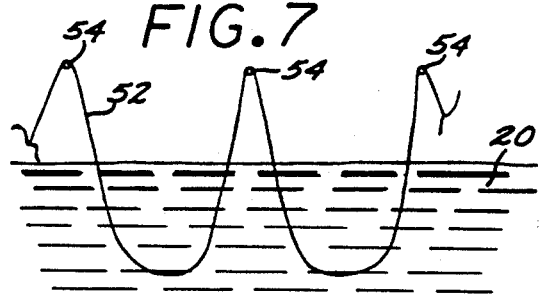
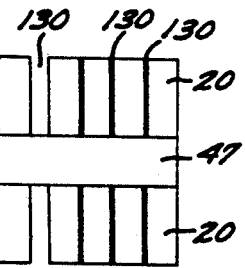
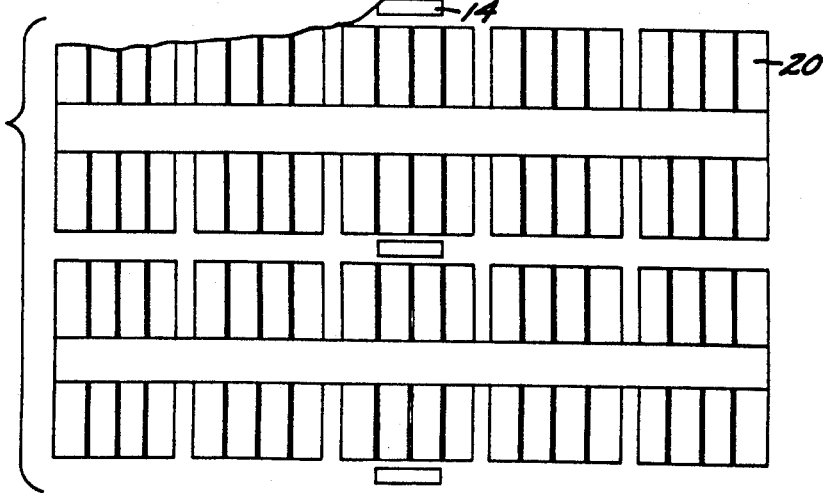

METHOD AND APPARATUS FOR HIGH-INTENSITY CONTROLLED ENVIRONMENT AQUACULTURE

FIELD OF THE INVENTION

This invention relates generally to animal husbandry and more particularly to a method and system for space and energy efficient culturing of a dense population of aquatic organisms in an artificial environment.

DESCRIPTION OF THE PRIOR ART

It is widely known that many aquatic organisms, e.g. crustacea and fish, are enjoyable to eat. For reasons of palatability and health, it is best to prepare or cook the freshest animals available. However, certain species may be indigenous to geographical or ecological areas far removed from the desired market, e.g. tropical animals as compared to temperate markets. As a result, having fresh animals for consumption may be limited by the ability of the transportation used to deliver the aquatic organisms from their habitat to the desired market.

In addition, to further complicate the availability of fresh organisms for consumption, the target animal may live in an environment not conducive to easy harvesting, e.g. an ocean or a lake. This may result in the use of labor intensive and cost ineffective methods of harvesting, e.g. shrimping or fishing. Thus the harvesting of these animals maybe subject to chance, increasing their costs to the consumer.

In response to these difficulties, there have been proposed a number of aquaculturing systems, e.g. systems where the organism is raised in an artificial environment to increase the number of animals available for consumption. The system can be located in an area close to the desired market, reducing the costs and time of transportation, thus providing fresh organisms for consumption in locations far removed from their normal habitats. In addition, the raising of the animal in a closed environment enables the quick and efficient gathering of the particular animal being raised, e.g. all water contained within the artificial environment can be drained through a net, harvesting the entire cultured population with a minimum of time and effort.

Further improvements to these latter methods include the sealing off of the artificial habitat from the outside environment. By this method, the animals may be enclosed within a greenhouse or a covered pond and thus isolated from the ambient environment. As a result, the cultured organisms are less susceptible to predation and disease. Furthermore, the culturer is now able to control the environment of the particular organism, e.g. maintain the environmental temperature necessary for the survival of the particular species being cultured. Thus a tropically indigenous organism may be raised in a temperate climate.

More specifically, as described in U.S. Pat. No. 3,998,186 issued Dec. 21, 1976, to Carl N. Hodges, these methods may use a translucent protective cover, sealing-off the pond or culturing medium. In addition, this method and apparatus provides the additional benefit of reducing conductive or transmissive loss of heat from the pond contained therein. This reduces the energy requirements of heating the water and allows the culturing of temperature-sensitive animals in previously unavailable geographical locations, e.g. allows the growing of tropical animals in temperate regions.

Fine adjustment of the artificial habitat temperature may be maintained by the insertion of appropriate amounts of heated water into the pond. Additional water may flow through the pond to remove accumulated animal waste and/or maintain the level of dissolved gases therein. However, heating up the water prior to its insertion into the pond tends to decrease the heated water's ability to dissolve or solubilize gases and increase the ability to dissolve or solubilize minerals therein. In addition, because of the large volumes of water which may be contained within the pond, correspondingly large volumes of heated water are required to adjust the entire body of water's temperature without having to inject a high temperature aliquot, which may harm the organisms growing within the pond. Furthermore, possible water shortages may limit the widespread use of these flow-through water aquaculturing systems.

As such, there is still room for improvement in these latter aquaculturing methods. For example, there is a need to reduce the area of land required, the amount of water use, and the amount of waste water generated; and provide a self-generation of food sources. In addition, incorporating methods allowing high organism density within the culturing ponds would minimize the requisite size of the entire aquaculturing complex. Furthermore, improvements to the method of heating the water may increase the production of these aquaculturing systems.

Hence, those concerned with the development and use of aquaculturing systems in the field of animal husbandry have long recognized the need for improved aquaculturing systems and methods which enable an energy efficient and economical aquaculturing of organisms in an artificial environment geographically remote from their natural habitat. The present invention fulfills all of these needs.

SUMMARY OF THE INVENTION

Briefly and in general terms, by way of example, the aquaculturing system and method of the present invention provides, in accordance with the present invention, a new and improved system embodying novel methods and apparatus for high-intensity raising of the organisms within an artificial environment which maximizes the size of the harvest, with a reduction in the use of the amount of water, energy and land surface area needed to produce a given amount of organisms in a geographical location remote from the organisms natural habitat.

In accordance with the present invention, an aquaculturing system of the present invention includes a controlled aquatic environmental unit with an earthen pond having a generally V-shaped bottom. The pond bottom is chemically treated to reduce seepage and may be lined with a thermal blanket to minimize heat loss to the surrounding soil. A framework supports a thermally isolating dome over the pond. The dome is formed of a plurality of layers of flexible material separated by an inflated air space defined therebetween to provide a thermal barrier interposed between the enclosed pond and the ambient environment. Support ropes are suspended above the pond to engage netting, hanging downward into the pond towards the pond bottom.

Disposed within the pond are heating aerator assemblies for bubbling a volume of heated air into the pond. A plurality of these ponds are placed adjacent to one another, with walkways and spillways periodically interposed therebetween.

Furthermore, the present invention includes a method for high-density aquaculturing of organisms within the aforedescribed apparatus, including the step of isolating a body of water within the controlled aquatic environmental unit, e.g. building the unit.

A substantially self-sustaining food chain is established within the pond by inserting nitrogenous waste products into the pond water and allowing microorganisms to grow and population plateau. After the pond eco-system is stabilized, the pond is innoculated with the organisms to be cultured The size of the organisms is monitored by periodical biomass sampling of the pond. The organisms are raised to the desired size by maintaining the desired dissolved gas, food and temperature levels within the pond. The water is heated by the bubbling of a heated volume of air into the pond. When the organisms are determined to be of marketable size, the entire population is harvested by the draining the pond contents through a net.

Other features and advantages of the present invention will become apparent from the following detailed description, taken in conjunction with the accompanying drawings, which illustrate, by way of example, the principals of the invention.

BRIEF DESCRIPTION OF THE DRAWINGS

Brief Description of the Invention

FIG. 4 is an enlarged fragmentary transverse view taken from the circle designated 4 in FIG. 2;

FIG. 5 is a reduced top plan view of a row of said ponds;

FIG. 6 is an enlarged sectional elevational view of the aerators of the present invention.

FIG. 7 is a sectional longitudinal view, taken along the lines 7—7 of FIG. 3; and FIG. 8 is a fragmentary top plan view of an entire aquaculturing pond system.

DETAILED DESCRIPTION OF THE INVENTION

Referring now to the exemplary drawings for the purposes of illustration, there is shown the high-density aquaculturing system of the present invention, generally designated 10, which includes a heating system, generally designated 14, in fluid communication with an isolated or controlled environmental unit, generally designated 16. For the purposes of illustration, the term "high density" refers to raising a greater number of organisms than normal aquaculturing systems. For example, the system and method of the present invention may raise approximately 20,000 fresh water shrimp per pond as opposed to normal methods raising about 16,000 to about 20,000 shrimp per acre.

Figure 1:
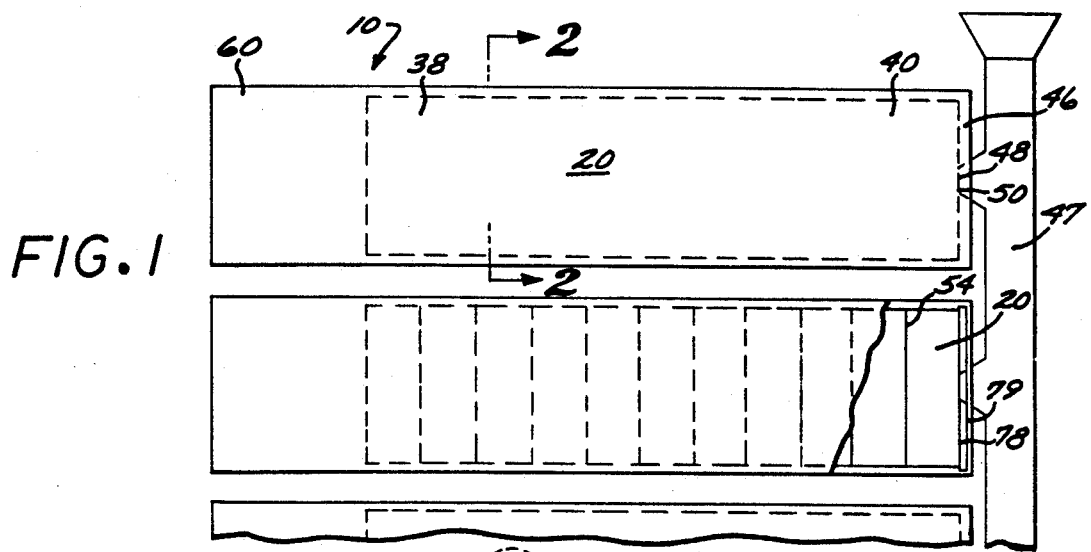
FIG. 1 is a fragmentary top plan view of an aquaculturing pond of the present invention.
Figure 2:
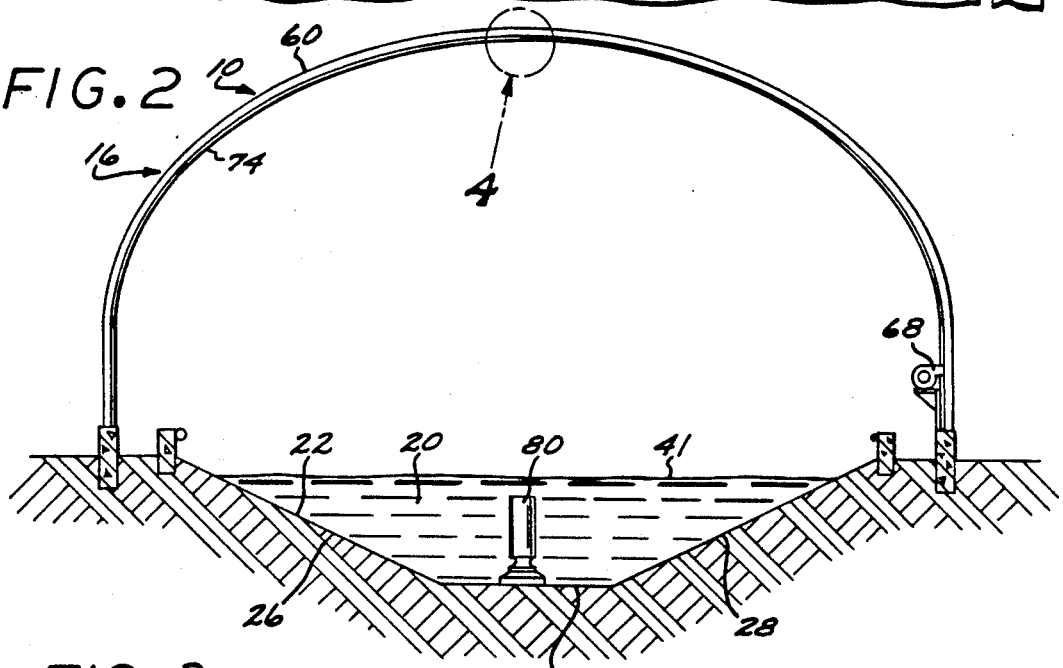
FIG. 2 is a transverse sectional end view, in enlarged scale, taken along the lines 2—2 of FIG. 1.
Figure 3:
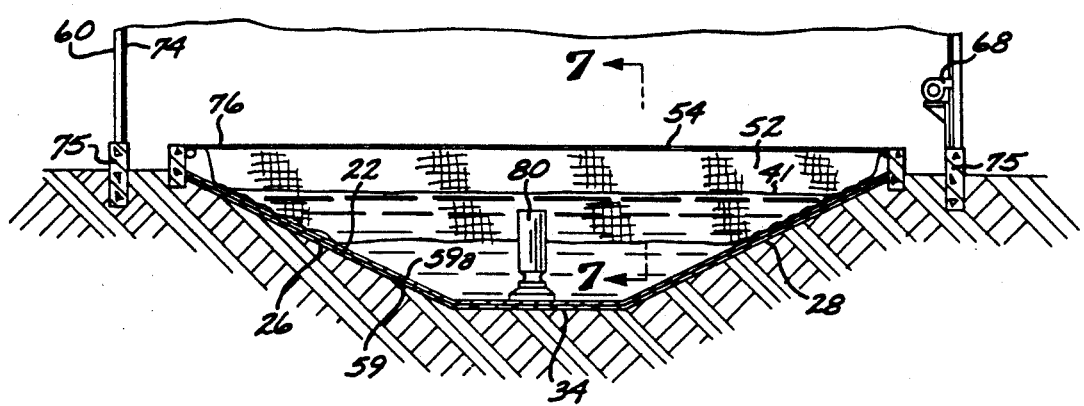
FIG. 3 is a fragmentary transverse end view, in enlarged scale, of an alternative embodiment of FIG. 1.

Referring now to FIGS. 1-3, the isolated environmental unit 16 of the present invention includes a body of water 20, e.g. a pond. The pond has a preferred length of about one hundred feet, with a long transverse dimension, i.e. width, of about twenty-five feet. Furthermore, as best shown in FIGS. 2 and 3, the pond has a generally V-shaped bottom 22 to maximize the bottom surface area of the pond. In one preferred form, the bottom has opposite sides 26 and 28 sloping downwardly and laterally inward to join with a generally horizontal and slightly sloping bottom floor 34. The sloping side 26 and 28 may extend, for example, downwardly at about twenty degrees relative the horizontal plane defined by the pond's top surface. As best shown in FIG. 1, the bottom floor slopes longitudinally from a shallow end 38, having a depth of three and one-half feet, to a deeper end 40, having a depth of about four and one-half feet. As so configured, each pond will contain about 29,620 gallons, and have a surface area of about 2,750 square feet.

A drain (not shown) in communication with a straining system (not shown) may be formed within the bottom floor 34 at its deep end 40 to enable the draining of the entire pond and its cultured contents through the straining system to facilitate the harvesting of the organisms grown therein. Alternatively, as best shown in FIG. 1, the pond has an endwall 46 separating the deep end from a spillway 47, the endwall of the pond having a gap 48 formed therein allowing the flow of water therethrough.

A gate 50 across the gap 48 allows for the selective opening and closing of the gap and thus the retention of the pond contents. Netting, not shown, having a mesh size small enough to strain out or catch the particular organism harvested, may be extended across the gap 48 to gather the organisms as the water flows into the adjacent spillway 47. The pond may be partially excavated and partially diked. To minimize the seepage of the pond contents into the water table, the soil substrate forming the pond bottom is chemically hardened prior to use. One such chemical is the liquid chemical soil stabilizer sold under the trademark of "PAK-ZAL".

Referring to FIGS. 3 and 7, to adapt the pond 20 for high density occupation by the organism being cultured within the ponds 20, despite the aggressive, highly territorial nature of the organism, e.g. as with the fresh water prawn *Macrobranchium rosenbergii*, large mesh netting 52, having apertures large enough to allow movement of the organisms therethrough, hangs down into pond 20, from support ropes 54, suspended above the pond. This festooning of the pond with netting vertically divides the pond or habitat into a plurality of niches, enabling a high-density population or occupation by the cultured organism therein. For example, with the fresh water prawns earlier described, this vertical dispersion of the organisms within the pond permits densities of about eight to about ten rosenbergii per square foot of pond water. This raises the output from about 20,000 to about 60,000 fresh water prawns per acre, by conventional pond methods, to about 20,000 fresh water prawns per pond, by use of the apparatus and methods of the present invention, i.e. about 10 to 20 times the population density of conventional aquaculturing methods, despite the above-described species being highly territorial and cannibalistic.

Alternatively, if the organism to be raised is indigenous to a salt water habitat as opposed to fresh water, a separate lining or layer (not shown) of a water impermeable material may be incorporated within the bottom of the pond, to reduce seepage and prevent upsetting the chemistry of the soil substrate.

Furthermore, if the soil temperature of the desired site is anticipated to be about forty-five degrees Fahrenheit or less, e.g. in temperate climates, a thermal blanket 59 is layered or incorporated into the pond bottom 22. In one preferred form, the thermal blanket is of a dual layered configuration, sold under the trade name "DURACOAT", having a first layer of cotton material bonded to a layer of aluminized material. In one preferred form the thermal blanket is interposed between the soil substrate and the pond bottom. Sand or bentonite 59a may be layered about three to four inches thick atop the thermal blanket 59 to provide material to help thermally isolate the pond from the ground and maintain the desired water temperature.

Furthermore, to minimize evaporation and heat loss via conductive and/or convective transmission from the pond, a thermally isolating dome 60, encloses or seals-off the pond 20. As best shown in FIG. 4, the thermally isolating dome includes a plurality of substantially concentric layers 62 and 64 positioned over the pond. In one preferred form, a first and second layers of a translucent, flexible material, e.g. clear plastic about four to about six mills thick, together define a cavity 66, containing an air layer therein. Referring to FIGS. 2 and 3, a continuously operating squirrel-cage fan 68 is fluidly communicated with the cavity to allow the insertion of heated air therein. This thermally isolating dome minimizes losses due to unwanted predation and disease by sealing off the organisms cultured within the pond from the ambient environment. In addition, because of the thermal barrier created by the air layer within the cavity disposed between the plural layers of material, this dome enables one to control the temperature of the artificial environment created within the isolated environment unit.

The thermal isolating dome 60 is preferably about one-hundred and thirty feet long by about thirty feet wide and rises to a height of about twelve feet above central axis of the pond 20. A quonset hut-shaped framework 74, made of pipe or other rigid material, is constructed above the pond to provide support to the isolating dome. The framework 74 may be anchored in a concrete wall 75 set within the ground. By this configuration and the dual layers of clear plastic material 62 and 64, a greenhouse effect is generated to raise and maintain the temperature within the isolated environmental unit 16, to the desired levels, e.g. about twenty-five to about thirty degrees centigrade. However, by selective use of translucent materials of differing albedoes or transmissive qualities, the temperature within the isolated environmental unit may be manipulated to different levels depending upon the particular organism to be raised. Reinforcing members (not shown) may be interwoven within the translucent material to provide added strength for resisting wind damage. These reinforcing thread members provide additional durability by limiting tear propagation. Additionally, automatic louvered panels (not shown) disposed in the thermally isolating dome 60, may be used to allow air to pass from within the thermally isolating dome 60, to help control the temperature therein.

Referring to FIGS. 1 and 3, a second thermal covering 76 is selectively extended from an open configuration, generally wrapped about a rotatable member 78, as best shown in FIG. 1, to a closed configuration generally horizontal and parallel to the surface of the pond 41, as best shown in FIG. 3, by conventional roller mechanisms 79 to provide additional means to reduce conductive and transmissive heat loss from the pond. The roller mechanism is preferably disposed adjacent the end wall 46 so that the covering extends longitudinally over the pond 20. In addition, the earlier described support ropes 54, extending transversely across the pond 20, help support the second thermal covering thereabove. The second thermal covering may be formed by a dual layered material, sold under the trademark "DURACOAT", similar to that used as the thermal blanket 59, e.g. a first layer of aluminized material bonded to a second layer of black vinyl.

Further, in order to help maintain life support requirements, e.g. food, temperature, and heat, during the particular growth period within the pond, the heating system 14 includes a plurality of heating aerators 80 placed upon the pond's bottom floor 34. Referring to FIG. 5, in the preferred form, three heating aerators are equidistantly positioned on the pond's bottom floor. An a/c motor 82 drives an air compressor 84 to impell a volume of air received through an air receiver unit 86. The impelled air is communicated through a heat pump 88 to generate a volume of heated air, e.g. twenty-five standard cubic feet per minute. The volume of heated air is fluidly communicated via a conduit system 90 to the heating aerators. In one preferred form, the conduit 90 includes a first and second manifolds 96 and 98 and as best shown in FIG. 5, each manifold is disposed adjacent to an end of a row of ponds 20. An individual pond conduit 100, communicates each pond and heating aerators therein. A valve means 102, disposed within each individual pond conduit 100, enables individual flow adjustment for each pond 20. In addition, due to the extensive length of the manifolds 96 and 98, and the varying distance of each pond 20 from one heat pump 88, a heat exchange or booster 106 may be disposed within the manifold or individual pond conduit to maintain the temperature of the heated air volume. If the heat pump utilizes natural gas or other combustive products, gas pipelines 108 may fluidly communicate the heat pumps with the gas source (not shown).

Referring to FIG. 6, the heating aerator 80, anchored by a concrete base 114, includes a vertical column 118 having a central longitudinal bore 120 disposed axially therein, and a plurality of radial passages 126 formed within the vertical column adjacent the bottom of the column to communicate the central bore with the outside of the column. A top opening 127 also communicates the central bore with the outside of the column. A plurality of counter-rotating turbines 128 are axially disposed within the central longitudinal bore. A disperser 132 is located adjacent the bottom of the column to communicate the central bore with the conduit system 90, the air compressor 84, and the heat pump 88. As a result, heated air generated by the air compressor and the heat pump flows into the bottom of the central longitudinal bore and is atomized as it passes through the disperser, at about 6.7 cfm, to naturally rise through the pond water contained therein to the top of the column. The plurality of counter-rotating turbines reduces the bubbles of heated air even further, to simultaneously mix, stir, aerate, and heat water drawn into the bottom of the column, through the radial passages, upward through the central longitudinal bore and outward through the top opening of the heating aerator. The configuration of the aerators are more particularly described in U.S. Pat. No. 3,969,466, issued to Grover C. Franklin, Jr. on Jul. 13, 1976 and commercially available through the Ramco Sales Corporation of San Pedro, Calif.

As a result, the heating aerator 80 aerates the pond 20 by the use of heated air to simultaneously raise the oxygen level of the dissolved gases within the pond water and heat the water. Since heated air is used as the fluid medium to raise the temperature of the water, the approximately 30,000 gallons of water which are generally contained within each pond may be heated within a shorter amount of time than if heated aliquots of water were inserted into the pond volume. In addition, large quantities of heated water are not needed to adjust the temperature of the pond. Thus, while the thermally isolating dome minimizes evaporative losses, the use of the heating aerators further minimizes the water flowing into and out from the isolated environmental unit 16. Futhermore, the use of these heating elements also imparts a circulating current within the pond to more uniformly disperse the dissolved gases, nutrients and minerals throughout the entire pond volume to more efficiently aquaculture the organisms therein.

While the above description has specifically described the construction of a single isolated environmental unit 16, an entire system may be constructed of a plurality of such units. Referring to FIG. 8, a system may be constructed whereby four ponds 20 may be placed adjacent to each, in a row, along their longitudinal dimensions. Walkways 130 may be disposed between each pond to enable passage into the spillway 47 which separates adjacent rows of adjacent ponds. The system includes about fifty ponds within the above-described array so that the harvesting of the individual ponds may be performed sequentially to provide a staggered continuous harvesting of the organisms throughout the entire year.

In operation, it first needs to be determined what type of organism is going to be cultured, to enable the harvester to detail out the specific design considerations necessary for use with the particular organism, e.g. the required temperature to be maintained within the environmental unit, lighting conditions, Ph, salinity, type of food and gestation period, and other environmental parameters or concerns. For example. the giant Malaysian prawn, *Macrobrachium rosenbergii*, may be a species raised in these ponds. This large shrimp-like animal is a prized delicacy in the Asian communities and it is now generally accepted by the general public. However, since the Macrobrachium is a native to Malaysia, it is a warm water species and is most comfortable at a temperature at about twenty-eight degrees centigrade. Furthermore, the animal is highly territorial, agressive and cannibalistic. As a result, aquaculturing of this particular animal in locations far removed from its tropical habitat has raised substantial problems. However, the application of the following methods to the earlier described apparatus with this particular organism has solved these problems.

After the pond has been constructed, to substantially isolate the pond within a controlled aquatic environmental unit, the harvester will establish a self-sustaining food chain or eco-system within the pond. This may be performed by the stocking of the pond with nitrogenous waste products such as poultry and/or bovine manure. About fifty to one-hundred pounds of commercially available fertilizer is inserted into each pond 20. Micro-organisms present in the fertilizer grow and propagate within the pond. A growth period of about one to about two weeks allows the population of micro-organisms present in such manure to propagate and achieve a population plateau. Using organisms which feed on and propagate in nitrogenous waste rich environments helps convert waste generated by the cultured organism into food for that organism. This reduces the need to continuously flush the system and supplement the organism's food supply. The above-described time period usually allows the population to plateau or to be of sufficient density to sustain the prawns during their growth period phase. If alternative cultured organisms are used, the pond is innoculated and allowed to population plateau with the appropriate organism upon which the cultured organism feeds.

When the eco-system is stabilized within the pond volume, the pond 20 may be innoculated with a population of post-larval prawns, preferably all about the same age. For the purposes of illustration, from about fifteen to about twenty thousand fresh-water prawns are inserted into the pond 20. Periodic conventional biomass sampling may be taken at regular phases during the growth period to ascertain the amount of biomass present within the pond. Supplemental feeding of the prawns with commercial-protein mix feed preparations, for example from Ralston-Purina, may be inserted once or twice a week. The amount of supplemental feeding is preferably about one-fifth of the biomass determined by the periodic biomass samplings.

Aquatic plants may be inserted into the pond to help maintain the desired $O_2$ levels, e.g. totally saturated, within the pond water and also to provide additional cover and surface areas for the organisms being grown within the pond. For example, sufficient water hyacinths, enough to cover about one-quarter of the pond's surface area, may be planted to provide food for the prawns, and aid in maintaining the water quality, i.e. increase dissolved $O_2$ levels. At the end of each harvest period, these aquatic plants may also be harvested and used for mulch. Care should be taken in using these particular plants to prevent their introduction into the local habitat and possibly upsetting the local environmental balance.

Dissolved gas, temperature and waste product regulation is maintained in part by the use of aquatic plants and also the bubbling heating aerators as earlier described. The use of these heater aerators minimizes the water usage of the present system since water is not used to heat the pond nor flush out waste, conserving the amount of water used. Furthermore, the water contained within the pond may be retained after harvesting for sale to local farmers as fertilizer-rich irrigation water, or for reuse in the system.

When the biomass tests and visual inspection o the partular organisms reveals that the population has matured to the desired size, i.e. marketable size, the entire population may be removed at once and harvested with ease. The pond configuration allows the harvester to remove all the organisms from the pond at one time, e.g. the water is drained through the drain having a strained opening, or e.g. netting across the gap 48, to collect all the organisms passing therethrough. Alternatively, the spillway, to allow the removal of all the pond contents at once, may be constructed to run a substantial portion of the long transverse dimension, i.e. width, of the pond, e.g. from about six to about eight feet. The netting would collect most of the prawns as the water passes therethrough. Those prawns that remain in the pond may be hand gathered since the gentle slope of the pond bottom allows easy entrance and movement within the pond by manual gatherers. The prawns may be then sorted to size, boxed and shipped live to markets close to the aquaculturing system 10 of the present invention or to other food processing facilities.

As a result of the system 10 and the above described methods, the need for large amounts of water flowing into, e.g. for heating, circulating and maintaining dissolved gas levels, and out from the system, e.g. for removal of waste products, is reduced. In addition, the new and improved aquaculturing system of the present invention provides for the high-density raising of organisms geographically adjacent to the desired market for such organisms. This process enables a close control over the product and its growth environment to enable simulation of tropical habitat in temperate climates. This system therefore allows the organisms to be grown adjacent the market to reduce transporation costs and achieve a freshness in the organisms which heretofore may have been limited to markets close to the naturally occuring habitat of the cultured animal.

While a particular form of the invention has been described, it will also be apparent to those skilled in the art, that various modifications can be made without departing from the scope of the invention. Accordingly, it is not intended that the invention be limited, except as by the appended claims.

What is claimed is:

1. A method for high density aquaculturing of organisms comprising the steps:

substantially isolating a body of water contained within a controlled environment unit substantially minimizing the water flowing into and out therefrom;

establishing a substantially self-sustaining food chain able to support high-density habitation of said organisms;

inserting post-larvae of said organisms, said post-larvae being of about the same age, into said controlled aquatic environmental unit;

maintaining the life support requirements of said organisms within said controlled environmental unit wherein said step of maintaining the life support requirements includes placing a heating aerator within said body of water contained within said controlled environmental unit, said heating aerator having a vertical column with a top, a bottom and a central bore formed therein, a plurality of radial apertures communicating said water with said central bore, and a plurality of counter-rotating turbines coaxially mounted within said central bore, forcing heated air into said bottom of said column, bubbling said heated air up through said column, said drawing water in through said radial apertures, into said bottom, said column, counter-rotating said plurality of turbines within said column to further divide said bubbles of heated air; and harvesting substantially all of said organisms after said organisms have grown to the desired size.

2. A method for high density aquaculturing of organisms:

substantially isolating a body of water contained within a controlled environmental unit substantially minimizing the water flowing into and out therefrom, wherein said step of substantially isolating a controlled aquatic environmental unit includes the steps of building a structure having an earthen pond with an essentially V-shaped bottom, and treating the ground with stabilizing compounds, to reduce the seepage of the pond water into the ground;

establishing a substantially self-sustaining food chain able to support high-density habitation of said organisms;

inserting post-larvae of said organisms, said post-larvae being of about the same age, into said controlled aquatic environmental unit;

maintaining the life support requirements of said organisms within said controlled aquatic environmental unit wherein said step of maintaining the life support requirements includes the steps of placing a heating aerator within said body of water contained within said controlled aquatic environmental unit, said heating aerator having a vertical column with a top, a bottom and a central bore formed therein, a plurality of radial apertures communicating said water with said central bore, and a plurality of counter-rotating turbines coaxially mounted within said central bore, forcing heated air into said bottom of said column, bubbling said heated air up through said column, drawing water in through said radial apertures, into said bottom of said column, and counter-rotating said plurality of turbines within said column to further divide said bubbles of heated air; and harvesting substantially all of said organisms for human consumption after said organisms have grown to the desired size.

3. A method for high density aquaculturing comprising the steps:

substantially isolating a body of water contained within a controlled environmental unit substantially minimizing the water flowing into and out therefrom wherein said step of substantially isolating a controlled environmental unit includes the steps of covering said pond with means for effecting a greenhouse effect within said environmental unit; building a structure having an earthen pond with an essentially V-shaped bottom, treating the ground with stabilizing compounds, to reduce the seepage of the pond water into the ground;

establishing a substantially self-sustaining food chain able to support high-density habitation of said organisms;

inserting post-larvae of said organisms, said post-larvae being of about the same age, into said controlled aquatic environmental unit;

maintaining the life-support requirements of said organisms within said controlled environmental unit wherein said step of maintaining the life support requirements includes the steps of placing a heating aerator within said body of water contained within said controlled environmental unit, said heating aerator having a vertical column with a top, a bottom and a central bore formed therein, a plurality of radial apertures communicating said body of water with said central bore, and a plurality of counter-rotating turbines coaxially mounted within said central bore, forcing heated air into said bottom of said column, bubbling said heated air up through said column, drawing water in through said radial apertures, into said bottom of said column, and counter-rotating said plurality of turbines within said column to further divide said bubbles of heated air; and harvesting substantially all of said organisms after said organisms have grown to the desired size.

4. A method for high density aquaculturing, comprising the steps:

substantially isolating a body of water contained within a controlled environment unit substantially minimizing the water flowing into and out therefrom, wherein said step of substantially isolating a controlled environmental unit includes the steps of building a structure having an earthen pond with an essentially V-shaped bottom, treating the ground with stabilizing compounds, to reduce the seepage of the pond water into the ground, covering said pond with means for effecting a greenhouse effect within said environmental unit and placing a plurality of layers of flexible material over the earthen pond and inserting air within the inflated airspace defined between said layers;

establishing a substantially self-sustaining food chain able to support high-density habitation of said organisms;

inserting post-larvae of said organisms, said post-larvae being of about the same age, into said controlled environmental unit;

maintaining the life support requirements of said organisms within said controlled environmental unit wherein said step of maintaining the life support requirements includes the steps of placing a heating aerator within said body of water contained within said controlled environmental unit, said heating aerator having a vertical column with a top, a bottom and central bore formed therein, a plurality of radial apertures communicating said body of water with said central bore, and a plurality of counter-rotating turbines coaxially mounted within said central bore, forcing heated air into said bottom of said column, bubbling said heated air up through said column, drawing water in through said radial apertures, into said bottom of said column, and counter-rotating said plurality of turbines within said column to further divide said bubbles of heated air; and harvesting substantially all of said organisms after said organisms have grown to the desired size.

5. A method for high density aquaculturing of aquatic organisms comprising the steps:

isolating post-larvae *Macrobranchium rosenbergii* of less than marketable size within a controlled environmental unit which minimizes the water flowing into and out from said unit by constructing a v-shaped bottomed holding pond with netting festooned from top to bottom, and enclosing said pond with a plurality of translucent flexible means for sealing off said holding pond;

establishing a substantially self-sustaining food chain within said holding pond by inserting nitrogenous waste products therein to initiate a totally self-generating food population;

maintaining the thermal requirements of the organisms by jointly adjusting the transmissive qualities of said flexible covering material and bubbling heated air into said holding pond; and harvesting substantially all of said organisms at the time when said organisms are at the desired size.

6. A method for high density aquaculturing as set forth in claim 5 wherein said V-shaped bottomed pond has opposite lateral sides sloping downwardly and inwardly to join with a generally horizontal bottom floor having a shallow end sloping longitudinally to a deeper end and having one end defining a gap therewithin for removal of said pond water contained therein.

7. A method for high density aquaculturing as set forth in claim 6 the step of maintaining the oxygen levels within the pond by planting sufficient numbers of water hyacinths, having pads floating upon the surface of said pond, to cover about one-quarter of the surface area of said pond.

8. A method as set forth in claim 6 wherein said step of constructing the pond includes the step of interposing a thermal blanket between said pond bottom and said habitat.

9. A method for high density aquaculturing as set forth in claim 5 including the step of maintaining the food levels within the pond by taking biomass samplings and supplementing said food levels with high-protein supplements in the amount of about one-fifth of said determined bio-mass.

10. A method for high density aquaculturing as set forth in claim 5 wherein said step of constructing a V-shaped pond includes the step of chemically hardening the surface of the pond bottom by the application of a liquid chemical soil stabilizer.

11. A method for high density aquaculturing of organisms comprising the steps:

substantially isolating a body of water within a controlled aquatic environmental unit;

substantially preventing water from flowing into and out therefrom;

inserting and raising post-larvae of said organisms of about the same age within said environmental unit for human consumption, including the step of maintaining the life support requirements of said organisms by heating a volume of air a sufficient amount to maintain the life support requirements of said organisms by bubbling said heated air into said body of water; and harvesting substantially all of said organisms after they grow to the desired size.

12. A method for high density aquaculturing of organisms comprising the steps:

substantially isolating a body of water contained within a controlled environmental unit;

substantially preventing the water flowing into and out therefrom;

establishing a substantially self-sustaining food chain able to support high-density habitation of said organisms;

inserting and raising post-larvae of said organisms, said post-larvae being of about the same age, within said controlled aquatic environmental unit;

maintaining the life support requirements of said organisms within said controlled environmental unit;

harvesting substantially all of said organisms after said organisms have grown to the desired size; and wherein said step of substantially isolating said body of water within the controlled environmental unit includes the steps of building an earthen pond, to contain said body of water, and festooning said earthen pond with netting.

13. A method for maintaining the desired thermal levels in an artificial aquaculturing environmental comprising the steps:

creating an isolated, artificial aquaculturing environment including a body of water, for raising organisms for human consumption;

heating a volume of air;

bubbling said heated volume of air through said artificial aquaculturing environment; and wherein said step of bubbling said heated volume of air through said artificial aquaculturing environment includes the steps of communicating the heated volume of air through a disperser at the bottom of a column, counter-rotating a plurality of turbines coaxially mounted within said column to further reduce the size of said bubbles of heated air floating upward within said column, and drawing water from said body of water into the bottom of the column to mix with said bubbles rising upward through said column, such that said aerator circulates, aerates, and heats said body of water within said artificial aquaculturing environment.

* * * * *

UNITED STATES PATENT AND TRADEMARK OFFICE
CERTIFICATE OF CORRECTION

PATENT NO. : 5,216,976
DATED : June 8, 1993
INVENTOR(S) : Vincent S. Marinkovich It is certified that error appears in the above-identified patent and that said Letters Patent is hereby corrected as shown below:

Column 8, line 48, after "inspection" delete "o" and insert --of--.

Column 9, line 51, delete "said"

Column 9, line 52, after "bottom" delete "," and insert --of--.

Column 11, line 2, after "controlled" delete "environment" and insert --environmental--.

Column 13, line 4, after "a" delete "disperser" and insert -dispenser--.

Signed and Sealed this

Twelfth Day of April, 1994

Attest:

BRUCE LEHMAN

*Attesting Officer*

*Commissioner of Patents and Trademarks*